(12) United States Patent
Oberoi et al.

(10) Patent No.: US 11,438,573 B2
(45) Date of Patent: Sep. 6, 2022

(54) VERIFICATION CIRCUITRY FOR ROW DRIVER FAULT DETECTION

(71) Applicant: SEMICONDUCTOR COMPONENTS INDUSTRIES, LLC, Phoenix, AZ (US)

(72) Inventors: Anirudh Oberoi, Bangalore (IN); Gurvinder Singh, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/700,480

(22) Filed: Dec. 2, 2019

(65) Prior Publication Data
US 2021/0092353 A1 Mar. 25, 2021

(30) Foreign Application Priority Data
Sep. 25, 2019 (IN) .............................. 201911038711

(51) Int. Cl.
*H04N 17/00* (2006.01)
*H04N 5/341* (2011.01)
*H04N 5/3745* (2011.01)

(52) U.S. Cl.
CPC ........... *H04N 17/002* (2013.01); *H04N 5/341* (2013.01); *H04N 5/37452* (2013.01)

(58) Field of Classification Search
CPC ... H04N 17/002; H04N 5/341; H04N 5/37452
See application file for complete search history.

(56) References Cited

U.S. PATENT DOCUMENTS

| 2008/0101468 | A1* | 5/2008 | Ishikawa | H04N 17/004 375/240.12 |
| 2008/0158363 | A1* | 7/2008 | Myers | H04N 5/335 348/187 |
| 2011/0285857 | A1* | 11/2011 | He | G03B 43/00 348/187 |
| 2013/0027574 | A1* | 1/2013 | Solhusvik | H01L 27/14618 348/222.1 |
| 2013/0083204 | A1* | 4/2013 | Solhusvik | H04N 5/378 348/187 |
| 2013/0293724 | A1 | 11/2013 | Martinussen | |
| 2013/0308029 | A1 | 11/2013 | Yaghmai | |
| 2014/0094993 | A1 | 4/2014 | Johnson | |

(Continued)

*Primary Examiner* — Antoinette T Spinks
(74) *Attorney, Agent, or Firm* — Treyz Law Group, P.C.; Joseph F. Guihan (57) ABSTRACT

An image sensor may include an array of imaging pixels and verification circuitry. Row control circuitry including row drivers may provide control signals to the pixels in the array of imaging pixels. The verification circuitry may test proper operation of the row drivers. The verification circuitry may be configured to pre-charge the first and second storage capacitors to a first bias voltage, intentionally discharge the first and second storage capacitors to a second bias voltage, reset only the first storage capacitor back to the first bias voltage, and use a first sample from the first storage capacitor and a second sample from the second storage capacitor to test operation of the row driver. If the row driver is operating correctly, a voltage swing will be detected between the two samples. If the row driver is stuck high or stuck low, the first and second samples may be the same.

20 Claims, 9 Drawing Sheets (56) References Cited

U.S. PATENT DOCUMENTS

| | | | |
|---|---|---|---|
| 2014/0247366 A1 | 9/2014 | Solhusvik et al. | |
| 2015/0009341 A1* | 1/2015 | Pahr | G01R 31/2829 |
| | | | 348/187 |
| 2015/0009375 A1* | 1/2015 | Agranov | H04N 5/35572 |
| | | | 348/295 |
| 2015/0244952 A1* | 8/2015 | Tani | H04N 5/3658 |
| | | | 348/246 |
| 2017/0330876 A1* | 11/2017 | Leedy | H01L 27/115 |
| 2018/0160109 A1* | 6/2018 | Johansson | H04N 17/002 |

* cited by examiner

VERIFICATION CIRCUITRY FOR ROW DRIVER FAULT DETECTION

This application claims the benefit of and claims priority to Indian Patent Application No. 201911038711, filed Sep. 25, 2019, which is hereby incorporated by reference herein in its entirety.

BACKGROUND

This relates generally to imaging systems, and more specifically, to imaging systems with image sensors and methods and circuitry for testing the integrity of the components in the image sensor.

Image sensors are commonly used in electronic devices such as cellular telephones, cameras, and computers to capture images. Conventional image sensors are fabricated on a semiconductor substrate using complementary metal-oxide-semiconductor (CMOS) technology or charge-coupled device (CCD) technology. The image sensors may include an array of image sensor pixels each of which includes a photodiode and other operational circuitry such as transistors formed in the substrate.

Over the lifetime of an electronic device, image sensors in the electronic device may be prone to failure. Conventional image sensors are sometimes provided with methods and circuitry for testing the functionality of the image sensor. However, verifying proper operation of an imaging system may require excess components that take up large amounts of space on an image sensor, increase complexity of manufacturing, etc.

It would therefore be desirable to provide improved imaging systems with verification circuitry.

DETAILED DESCRIPTION

Embodiments of the present invention relate to image sensors, and more particularly, to image sensors having verification circuitry. It will be recognized by one skilled in the art, that the present exemplary embodiments may be practiced without some or all of these specific details. In other instances, well-known operations have not been described in detail in order not to unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

Figure 1:
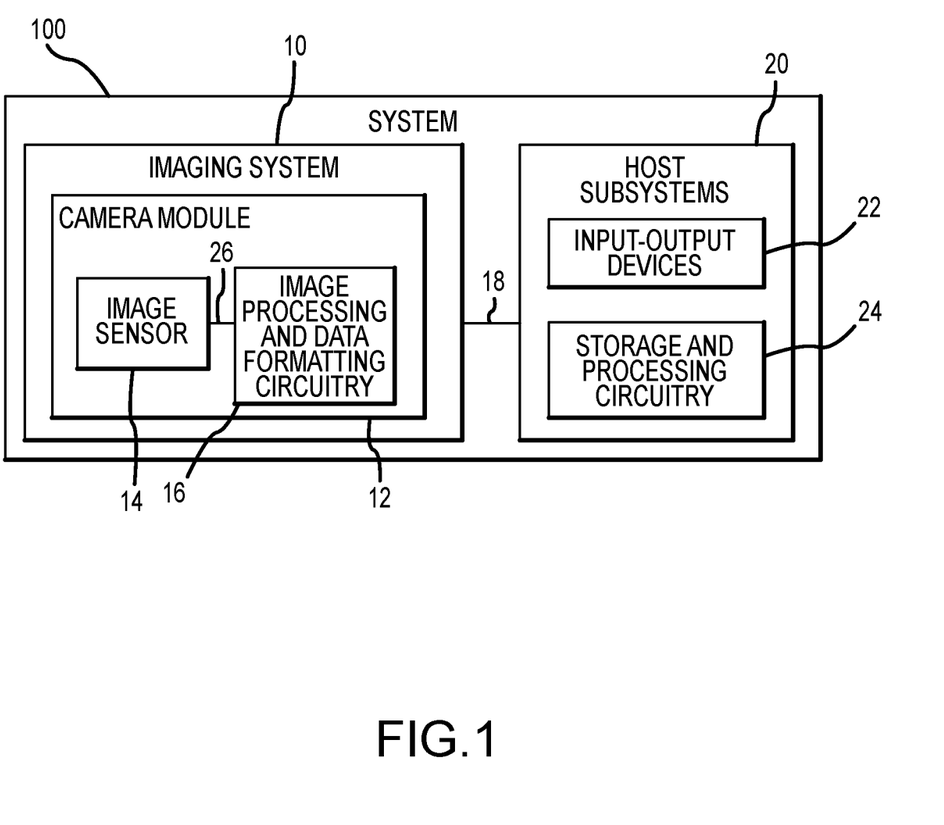
FIG. 1 is a diagram of an illustrative system that includes an imaging system and a host subsystem in accordance with an embodiment.

FIG. 1 is a diagram of an illustrative imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values. Each image sensor in camera module 12 may be identical or there may be different types of image sensors in a given image sensor array integrated circuit.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc. During operation of imaging system 10, camera module 12 may continuously capture and provide image frames to host subsystem 20.

System 100 may be a vehicle safety system. In a vehicle safety system, images captured by the image sensor may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, an image sensor may form part of a semi-autonomous or autonomous self-driving vehicle. Vehicle safety standards may require that the proper operation of any component of a vehicle safety system (including the image sensor) be verified before, during, and/or after operation of the vehicle. Verification operations for the image sensor may be performed by the imaging system prior to, during, and/or after operation of a vehicle (e.g., upon startup and/or shutdown of the imaging system).

Figure 2:
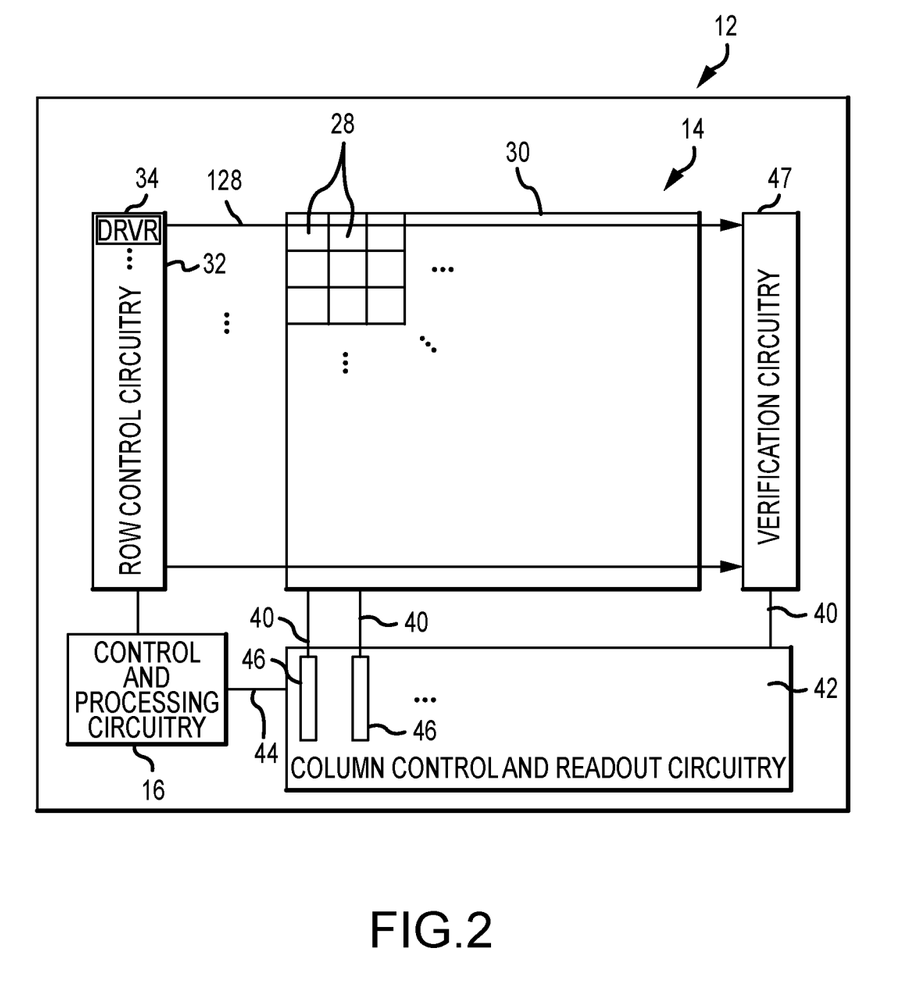
FIG. 2 is a diagram of an illustrative image sensor having an array of image pixels, verification circuitry coupled to the array of image pixels, and control circuitry coupled to the array of image pixels in accordance with an embodiment.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28 (sometimes referred to herein as image sensor pixels or image pixels 28), row control circuitry 32, column control and readout circuitry 42, and verification circuitry 47. Control circuitry 16 may be coupled to row control circuitry 32 and may be coupled to column control and readout circuitry 42 via global data path 44. Row control circuitry 32 may receive row addresses from control circuitry 16 and may have row drivers 34 that supply corresponding row control signals to image pixels 28 over control paths 128 (e.g., dual conversion gain control signals, pixel reset control signals, charge transfer control signals, blooming control signals, row select control signals, or any other desired pixel control signals). Verification circuitry 47 may also receive the row control signals and may verify proper operation of the row control signals.

Column control and readout circuitry 42 may be coupled to the columns of pixel array 30 via one or more conductive lines such as column lines 40. Column lines 40 may be coupled to each column of image pixels 28 in image pixel array 30 (e.g., each column of pixels may be coupled to a corresponding column line 40). One or more column lines may also be coupled to verification circuitry 47. Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out by circuitry 42 on column lines 40.

Column control and readout circuitry 42 may include a number of column readout circuits 46. Each column readout circuit 46 may be coupled to a corresponding column line 40 and may read out and receive image signals from pixels 28 coupled to the corresponding column line. Each column readout circuit 46 may include column circuitry such as a column amplifier for amplifying signals read out from array 30, sample and hold circuitry for sampling and storing signals read out from array 30, analog-to-digital converter (ADC) circuit for converting read out analog signals to corresponding digital signals, and column memory for storing the read out signals and any other desired data. Column readout circuits 46 may output digital pixel values to control and processing circuitry 16 over line 44.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Over the lifetime of the image sensor, the image sensor may be prone to failure. Therefore, image sensor 14 in FIG. 2 may include verification circuitry 47 for testing the functionality of the image sensor. In some embodiments, verification circuitry 47 may include verification circuit blocks that are coupled to respective rows of imaging pixels in array 30. Verification circuitry 47 may include logic circuitry, comparison circuitry, and/or latch circuitry if desired.

If desired, row control circuitry 32 and pixel array 30 may be integrated together in a single integrated circuit (as an example). Alternatively, row control circuitry 32 and pixel array 30 may be implemented in separate semiconductor substrates. In one example, pixel array 30 and verification circuitry 47 may be formed in a first chip, whereas the additional circuitry (e.g., row control circuitry 32, column control and readout circuitry 42, etc.) is formed in a second chip. The first chip may sometimes be referred to as a pixel sensor chip. The second chip may be referred to as an application-specific integrated circuit (ASIC) chip. The two chips may be connected by conductive interconnect layers (e.g., hybrid bonds and/or bonds at peripheral contact pads). The pixels of pixel array 32 may also be split between multiple semiconductor substrates if desired.

In the aforementioned described embodiment where image sensor 14 is implemented using stacked chips, it may be desirable for verification circuitry (e.g., verification circuitry 47 in the pixel sensor chip) to have only nMOS (n-channel metal-oxide semiconductor) transistors. Including only nMOS transistors in the pixel sensor chip (and no pMOS transistors) may reduce the amount of implant steps to form the chip during manufacturing. Additionally, forming the pixel sensor chip with only nMOS transistors (and no pMOS transistors) may reduce contamination. Therefore, it may be desirable to use only nMOS transistors in the pixel sensor chip. Even if all of image sensor 14 is formed using a single semiconductor substrate, it may be desirable for verification circuitry 47 to have only nMOS transistors to reduce the complexity of manufacturing of the image sensor.

Figure 3:
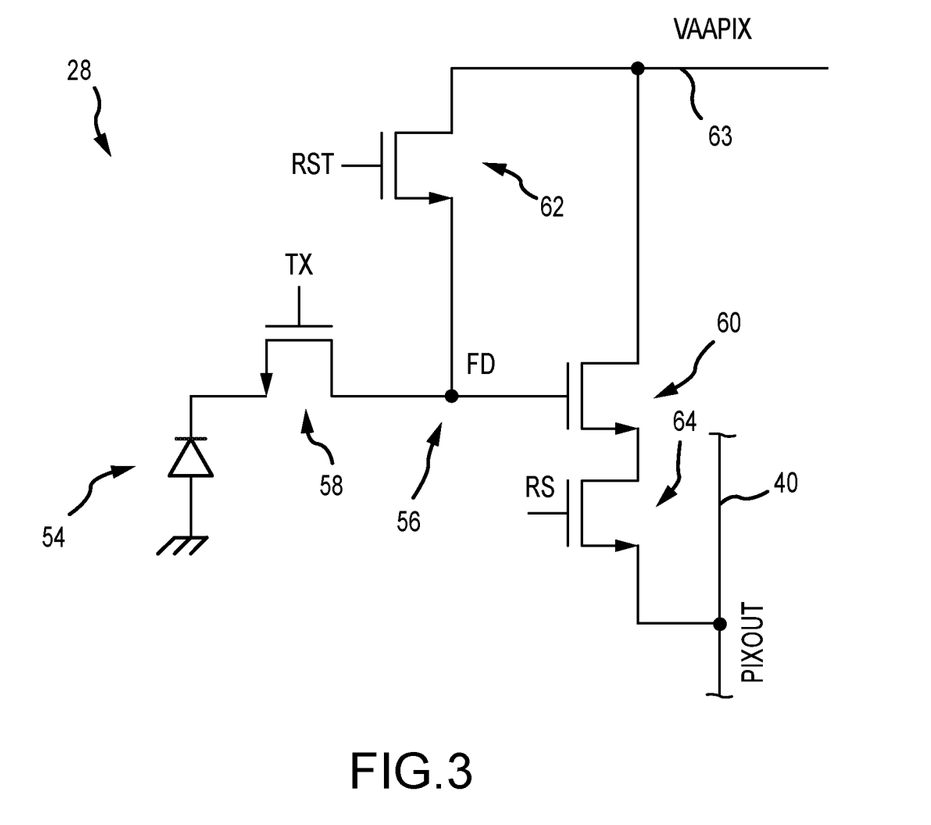
FIG. 3 is a circuit diagram of an illustrative pixel that may be included in an image sensor such as the image sensor of FIG. 2 in accordance with an embodiment.

FIG. 3 is a circuit diagram showing an illustrative structure of the pixels 28 in FIG. 3. As shown in FIG. 3, pixel 28 includes a photodiode 54, a floating diffusion region (FD) 56, and a transfer transistor 58. Photodiode 54 may sense light by converting impinging photons into electrons or holes. Transfer transistor 58 may be asserted to transfer charge from photodiode 54 to floating diffusion region 56. A row select transistor 64 is interposed between the drain of the source follower transistor 60 and column output line 40. To read out charge from floating diffusion region 56, the row select transistor 64 is asserted and the voltage corresponding to the charge at the floating diffusion region is read out on column output line 40. The floating diffusion region 56 is coupled to source follower transistor 60 and reset transistor 62. The source follower transistor is also coupled to a bias voltage supply line 63 that provides a bias voltage (e.g., $V_{AAPIX}$).

After charge to voltage conversion is completed and the resulting signal transferred out from the pixels (by asserting row select transistor 64), the pixel may be reset by asserting reset transistor 62 and coupling floating diffusion region to bias voltage supply line 63. In some arrangements, all of the transistors in pixel 28 may be nMOS transistors. In other words, transfer transistor 58, reset transistor 62, source follower transistor 60, and row select transistor 64 are all nMOS transistors. Transfer transistor 58 has a gate that receives transfer control signal TX. Row select transistor 64 has a gate that receives row select control signal RS. Reset transistor 62 has a gate that receives reset control signal RST. The pixel structure shown in FIG. 3 is merely illustrative. If desired, pixel 28 may include any other desired pixel components in any desired configurations (e.g., one or more storage diodes, one or more storage capacitors, an anti-blooming transistor, one or more dual conversion gain transistors, one or more dual conversion gain capacitors, etc.).

Figure 4:
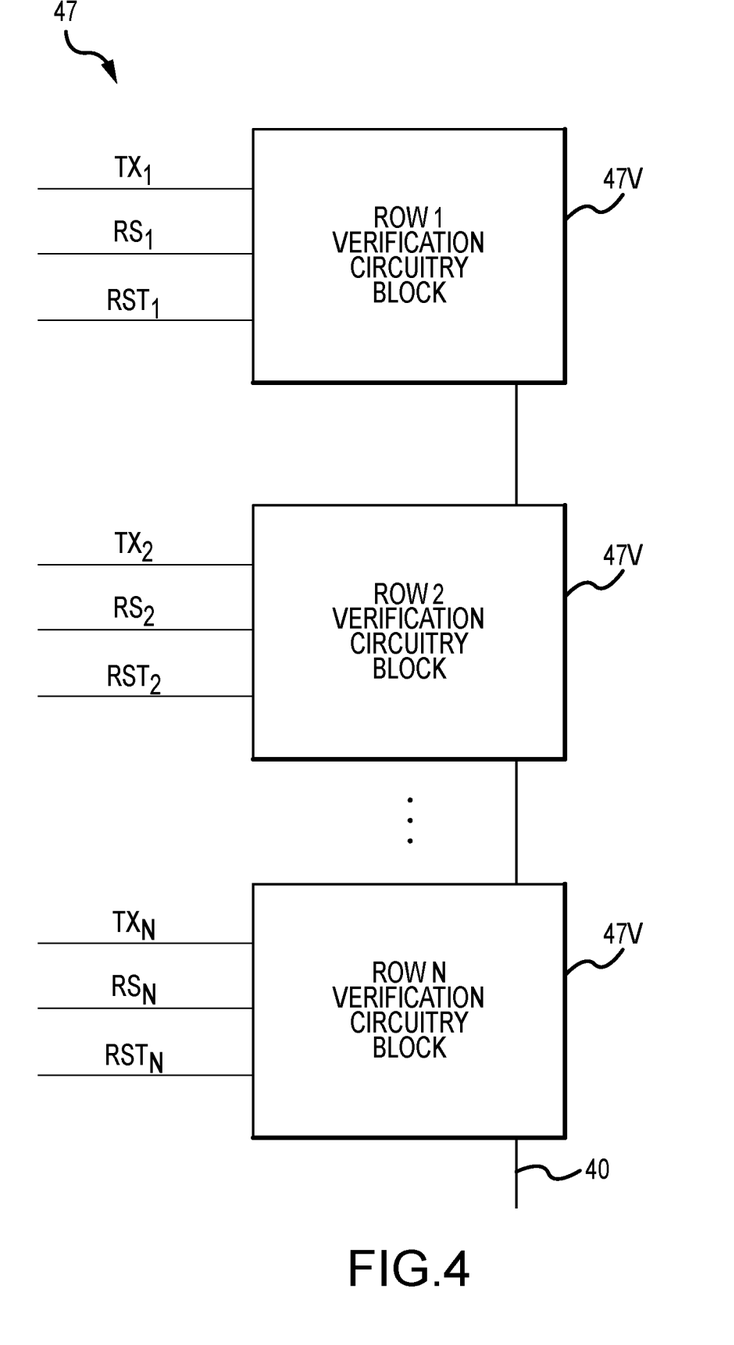
FIG. 4 is a schematic diagram of illustrative verification circuitry that may be included in an image sensor such as the image sensor of FIG. 2 in accordance with an embodiment.

FIG. 4 is a schematic diagram showing illustrative verification circuitry 47 that may be included in the image sensor. As shown, each row of imaging pixels in pixel array 30 may have an associated verification circuitry block 47V. Each verification circuitry block 47V may receive one or more row control signals associated with that row (e.g., transfer control signal TX, row select control signal RS, reset control signal RST, etc.). Verification circuitry block 47V may verify the proper operation of the row control signals (e.g., to ensure that one or more of the row control signals are being asserted in the desired manner). The verification circuitry blocks may be coupled to a column output line 40.

In FIG. 4, one verification circuitry block is depicted for each row of imaging pixels. This example is merely illustrative. Two or more verification circuitry blocks may be included for each row of imaging pixels if desired. A verification circuitry block may be shared between multiple rows of imaging pixels if desired. In FIG. 4, the verification circuitry blocks share a common output line 40. This example is merely illustrative, and additional output lines may be included if desired.

The verification circuitry blocks 47V of FIG. 4 may be used to test operation of a row driver (e.g., row driver 34 in FIG. 2) in an image sensor. Row drivers may be used to provide row control signals to rows of imaging pixels in a pixel array (e.g., on control lines 128). Exemplary row control signals that may be provided by corresponding row drivers include a transfer transistor control signal, a reset transistor control signal, a row select transistor control signal, a dual conversion gain transistor control signal, etc.

Regardless of the specific control signal provided by a row driver, it is desirable to be able to verify proper operation of the row driver. During normal operation, a control signal may be provided at either a logic low level (e.g., a first voltage) or a logic high level (e.g., a second voltage that is different than the first voltage). The control signal may be switched between the low and high levels to control transistors in the imaging pixels in a desired manner. However, in some cases, the row driver may not operate properly and may fail to switch the control signal between the low and high levels. The control signal may always be provided at the high level (e.g., in a "stuck high" scenario) or may always be provided at the low level (e.g., in a "stuck low" scenario). When the row driver is "stuck high" or "stuck low," the imaging pixels will not operate properly. Verification circuitry such as the verification circuitry block of FIG. 5 may be used to verify that the row driver is operating normally and is not stuck high or stuck low.

Figure 5:
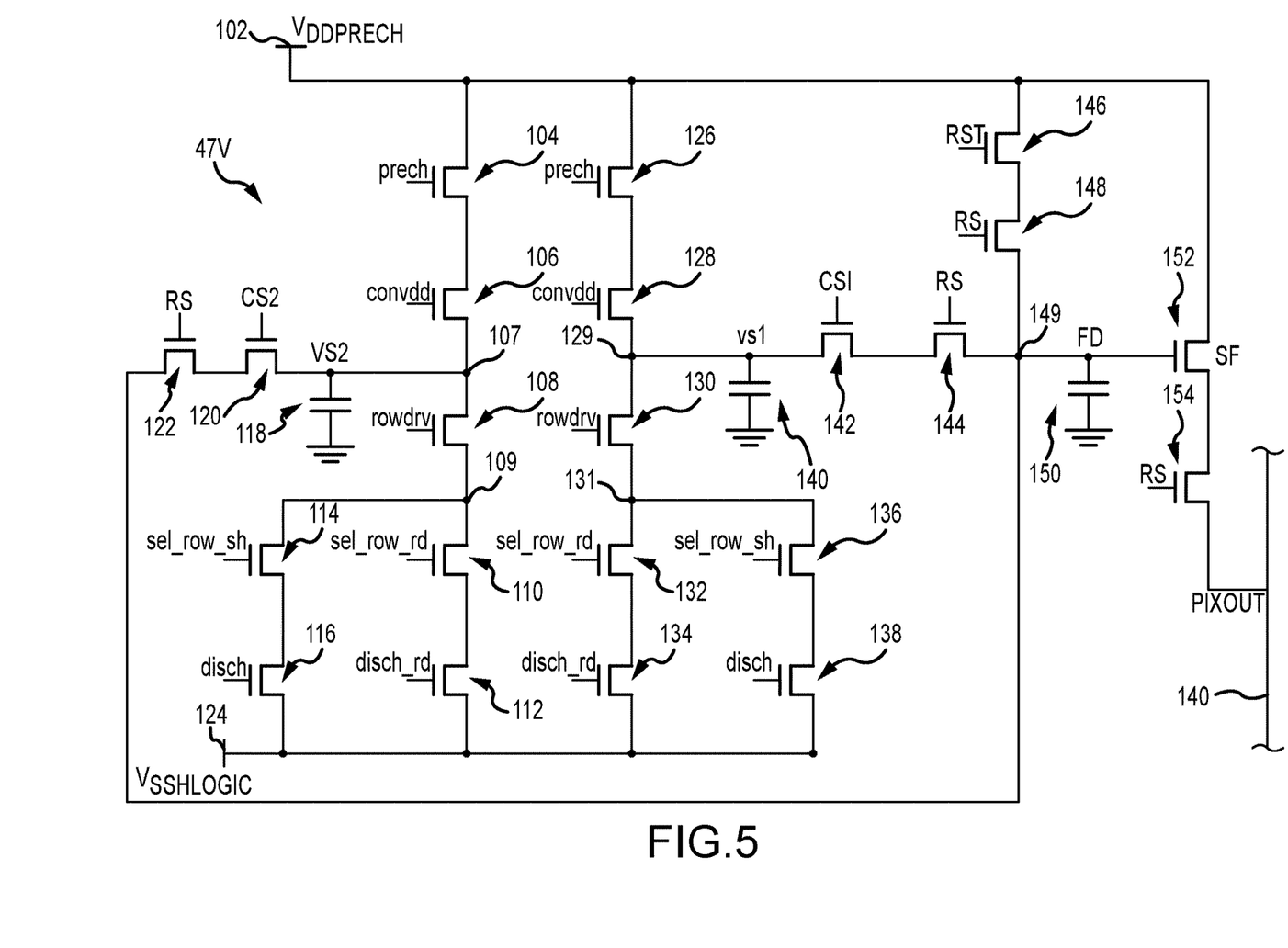
FIG. 5 is a circuit diagram of an illustrative verification circuitry block used to test proper operation of a row driver in accordance with an embodiment.

The verification circuitry block 47V of FIG. 5 includes a first bias voltage supply terminal 102. The bias voltage supply terminal 102 may provide a bias voltage ($V_{DDPRECH}$). A transistor 104 (e.g., pre-charge transistor 104) may be coupled to the bias voltage supply terminal. The first transistor 104 is coupled between a transistor 106 and the bias voltage supply terminal. Transistor 106 may be coupled between transistor 104 and node 107. Transistor 108 may be coupled between node 107 and node 109. Transistor 110 may be coupled between node 109 and transistor 112. Transistor 112 may be coupled between transistor 110 and bias voltage supply terminal 124. Bias voltage supply terminal 124 may provide a bias voltage ($V_{SSHLOGIC}$) that is different than $V_{DDPRECH}$.

Transistors 110 and 112 are therefore coupled in series between node 109 and bias voltage supply terminal 124. Transistors 114 and 116 may also be coupled in series between node 109 and bias voltage supply terminal 124 (in parallel with transistors 110 and 112).

Capacitor 118 is coupled to node 107, which is at voltage VS2. Transistor 120 is coupled between capacitor 118 and transistor 122. Transistor 122 is coupled between transistor 120 and node 149 (which is coupled to capacitor 150).

A transistor 126 (e.g., pre-charge transistor 126) may be coupled to the bias voltage supply terminal. The first transistor 126 is coupled between a transistor 128 and the bias voltage supply terminal 102. Transistor 128 may be coupled between transistor 126 and node 129. Transistor 130 may be coupled between node 129 and node 131. Transistor 132 may be coupled between node 131 and transistor 134. Transistor 134 may be coupled between transistor 132 and bias voltage supply terminal 124.

Transistors 132 and 134 are therefore coupled in series between node 131 and bias voltage supply terminal 124. Transistors 136 and 138 may also be coupled in series between node 131 and bias voltage supply terminal 124 (in parallel with transistor 132 and 134).

Capacitor 140 is coupled to node 129, which is at voltage VS1. Transistor 142 is coupled between capacitor 140 and transistor 144. Transistor 144 is coupled between transistor 142 and node 149 (which is coupled to capacitor 150).

Transistor 148 is interposed between node 149 and transistor 146. Transistor 146 is interposed between bias voltage supply terminal 102 and transistor 148. Capacitor 150 (sometimes referred to as floating diffusion region FD, floating diffusion node FD, etc.) is coupled to a gate of transistor 152 (sometimes referred to as a source follower transistor). Transistor 152 is coupled between bias voltage supply terminal 102 and transistor 154. Transistor 154 is coupled between source follower transistor 152 and column output line 40. When transistor 154 is asserted, an output voltage PIXOUT that is proportional to the voltage on floating diffusion region 150 may be output on column line 40.

Transistors 104 and 126 may have respective gates that receive a pre-charge control signal 'prech.' These transistors may therefore be referred to as pre-charge transistors or pre-charge control transistors. Transistors 106 and 128 may have respective gates that receive a control signal 'convdd.' Convdd may be a control signal that is normally high during normal operation of the imaging pixels, in one example. Transistors 106 and 128 may be referred to as pre-charge transistors or pre-charge control transistors.

Transistors 108 and 130 may have respective gates that receive a row driver signal 'rowdrv.' The row driver signal may be any control signal from a row driver in the image sensor. Verification circuitry 47V tests whether the row driver signal 'rowdrv' is properly operating. The row driver signal may be a transfer transistor control signal (TX), a reset transistor control signal (RST), a row select transistor control signal (RS), a dual conversion gain transistor control signal, etc. Transistors 108 and 130 may be referred to as row driver transistors, testing transistors, verification transistors, etc.

Transistors 110 and 132 may have respective gates that receive a row select read control signal 'sel_row_rd.' These transistors may be referred to as read phase discharge enabling transistors, read phase select transistors, discharge transistors, etc. Transistors 112 and 134 may have respective gates that receive a discharge read control signal 'disch_rd.' These transistors may be referred to as read phase discharge enabling transistors, read phase discharge transistors, discharge transistors, etc.

Transistors 114 and 136 may have respective gates that receive a row select shutter control signal 'sel_row_sh.' These transistors may be referred to as shutter phase discharge enabling transistors, shutter phase select transistors, discharge transistors, etc. Transistors 116 and 138 may have respective gates that receive a discharge control signal 'disch.' These transistors may be referred to as shutter phase discharge enabling transistors, discharge enabling transistors, shutter phase discharge transistors, discharge transistors, etc.

Transistor 120 may have a gate that receives a capacitor transfer control signal CS2. Transistor 120 may be referred to as a transfer transistor, capacitor transfer transistor, etc. Transistor 142 may have a gate that receives a capacitor transfer control signal CS1. Transistor 142 may be referred to as a transfer transistor, capacitor transfer transistor, etc.

Transistors 122, 144, 148, and 154 may receive a row select control signal RS. The row select control signal may be asserted when testing of the row of pixels including verification circuitry 47 is required. Transistors 122, 144, 148, and 154 may be referred to as row select transistors. Transistor 146 may have a gate that receives a reset control signal RST. Transistor 146 may be referred to as a reset transistor.

The arrangement for verification circuitry depicted in FIG. 5 is merely illustrative. If desired, one or more of the transistors depicted in FIG. 5 may be omitted. For example, one or more of transistors 104, 106, 108, 110, 112, 114, 116, 126, 128, 130, 132, 134, 136, 138, 120, 122, 142, 144, 146, 148, 152, and 154 may be omitted.

Operation of the verification circuitry of FIG. 5 may have three phases. First, during a pre-charge phase, capacitors 118 and 140 may be charged to $V_{DDPRECH}$. Next, during an intentional discharge phase, capacitors 118 and 140 may be discharged to $V_{SSHLOGIC}$. Finally, a read phase may be used to verify if the row driver being tested is operating properly. These phases of operation are discussed in greater detail in connection with FIGS. 6-9.

Figure 6:
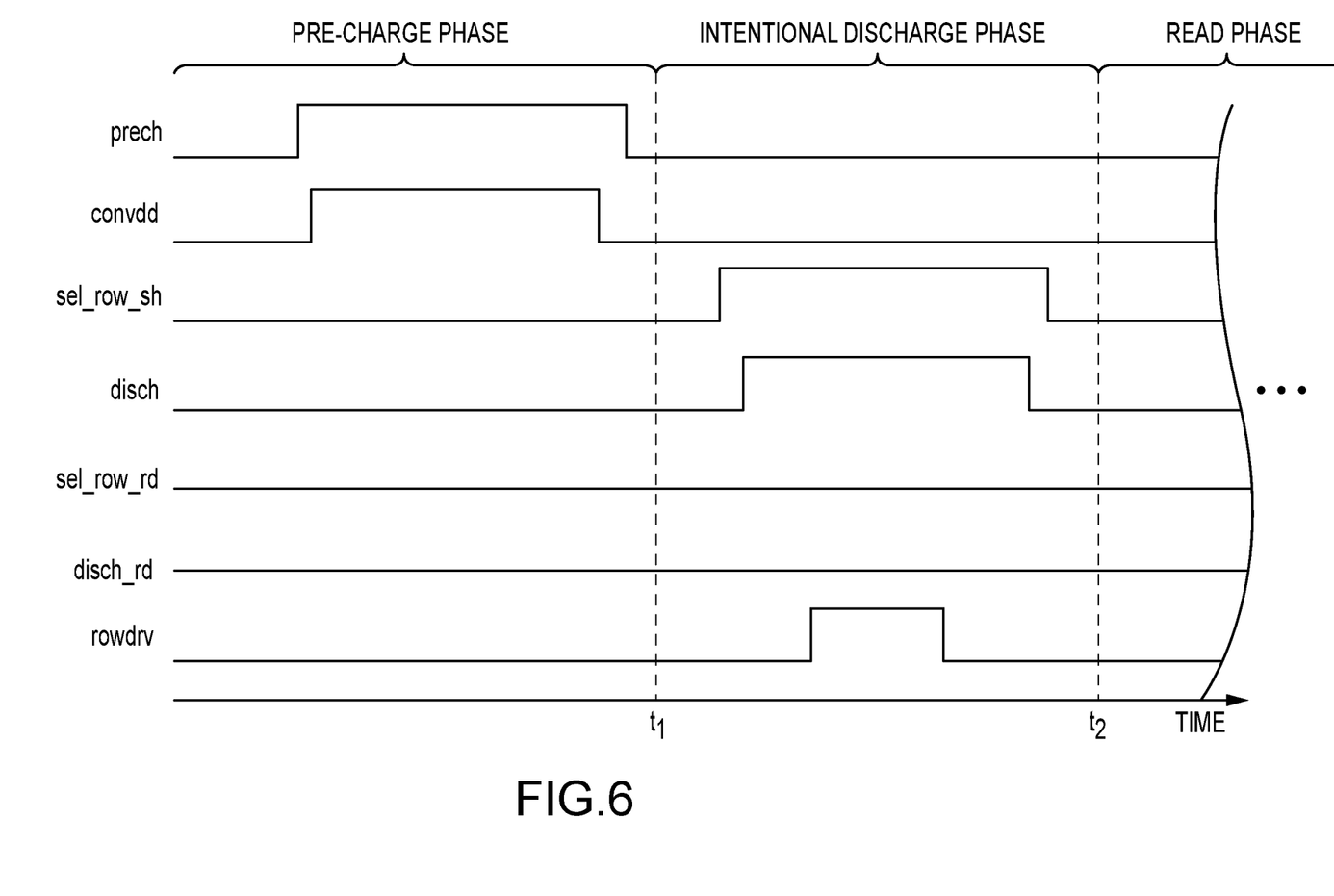
FIG. 6 is a timing diagram showing operation of the verification circuitry of FIG. 5 during a pre-charge phase and a discharge phase in accordance with an embodiment.

FIG. 6 is a timing diagram showing the operation of verification circuitry 47V of FIG. 5 during the pre-charge phase and intentional discharge phase. As shown, during the pre-charge phase, control signals prech and convdd may be raised high. This causes transistors 104 and 106 to be asserted, charging capacitor 118 to $V_{VDDPRECH}$ from bias voltage supply terminal 102. This also causes transistors 126 and 128 to be asserted, charging capacitor 140 to $V_{VDDPRECH}$ from bias voltage supply terminal 102.

The remaining control signals (e.g., sel_row_sh, disch, sel_row_rd, disch_rd, and rowdrv) may remain low during the pre-charge phase such that capacitors 118 and 140 remain at the pre-charged level. Because multiple transistors in series must be asserted for discharge to occur, one of the transistors (e.g., transistor 108 or transistor 130) may be raised high during the pre-charge phase without causing discharge of the capacitors.

At $t_1$ (after the pre-charge phase is concluded), capacitors 118 and 140 are charged to $V_{DDPRECH}$. Next, there may be an intentional discharge phase. This may occur during the shutter phase of operation of the imaging pixels that receive the signal from the row driver. During the intentional discharge phase, control signals sel_row_sh and disch are raised high. This results in transistors 114, 116, 136, and 138 being asserted. While transistors 114 and 116 are asserted, an assertion of transistor 108 will result in discharge of capacitor 118 to $V_{SSHLOGIC}$. While transistors 136 and 138 are asserted, an assertion of transistor 130 will result in discharge of capacitor 140 to $V_{SSHLOGIC}$. The rowdrv control signal may be asserted one or more times during the intentional discharge phase (if operating properly), thereby causing capacitors 118 and 140 to be discharged.

Therefore, at $t_2$, if the row driver is operating properly and rowdrv is asserted during the intentional discharge phase, both capacitors 118 and 140 will be at $V_{SSHLOGIC}$. If the row driver is malfunctioning and rowdriv is stuck high, the capacitors will still be discharged (due to the transistors 108 and 130 being asserted during the intentional discharge phase). Therefore, even if the row driver is stuck high, both capacitors 118 and 140 will be at $V_{SSHLOGIC}$ at $t_2$. If the row driver is malfunctioning and rowdrv is stuck low, then transistors 108 and 130 will not be asserted during the intentional discharge phase. Therefore, capacitors 118 and 140 will not be discharged and both capacitors 118 and 140 will still be at the pre-charged level $V_{DDPRECH}$ at $t_2$.

Figure 7:
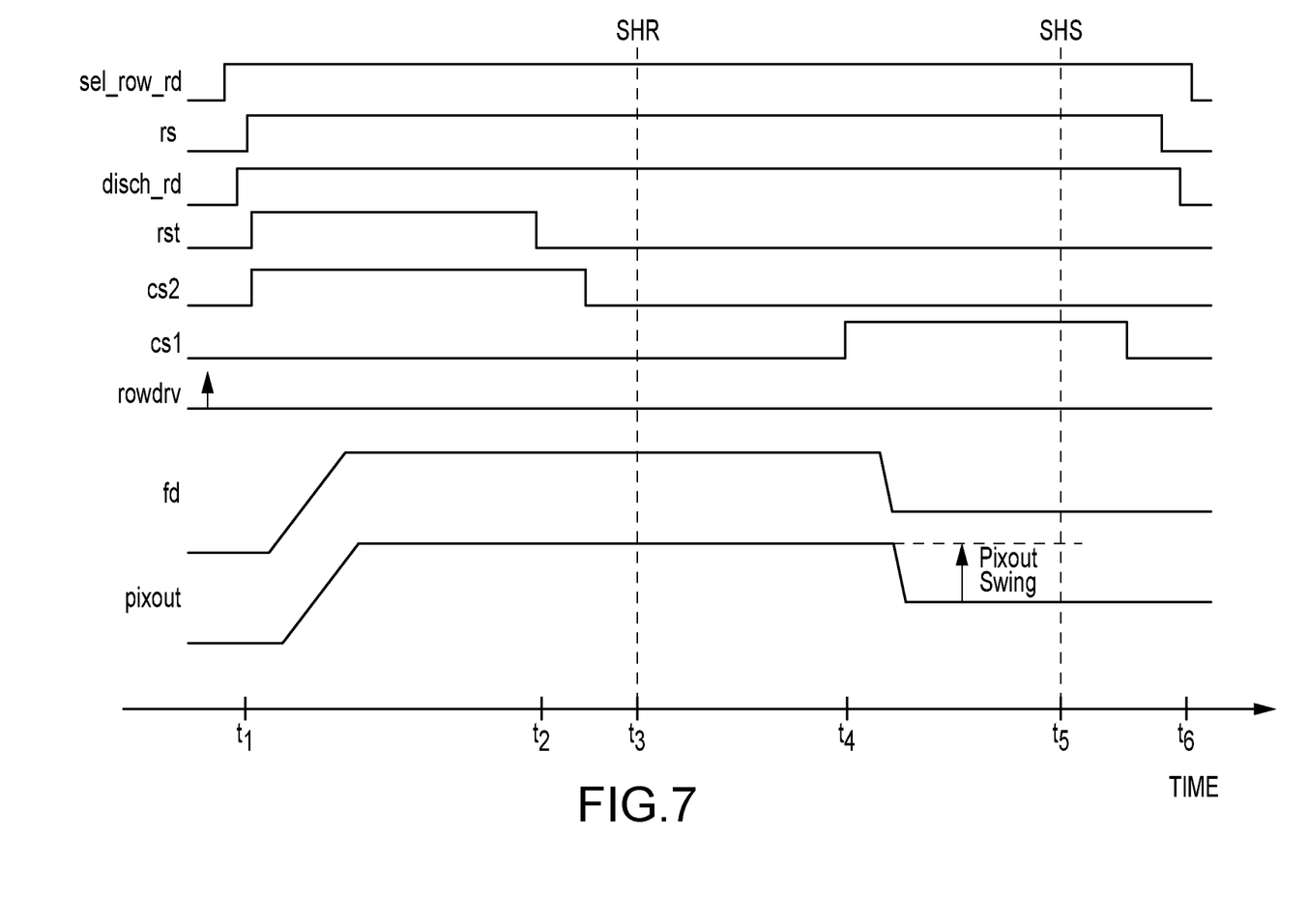
FIG. 7 is a timing diagram showing operation of the verification circuitry of FIG. 5 during a read phase when the tested row driver signal is operating normally in accordance with an embodiment.
Figure 8:
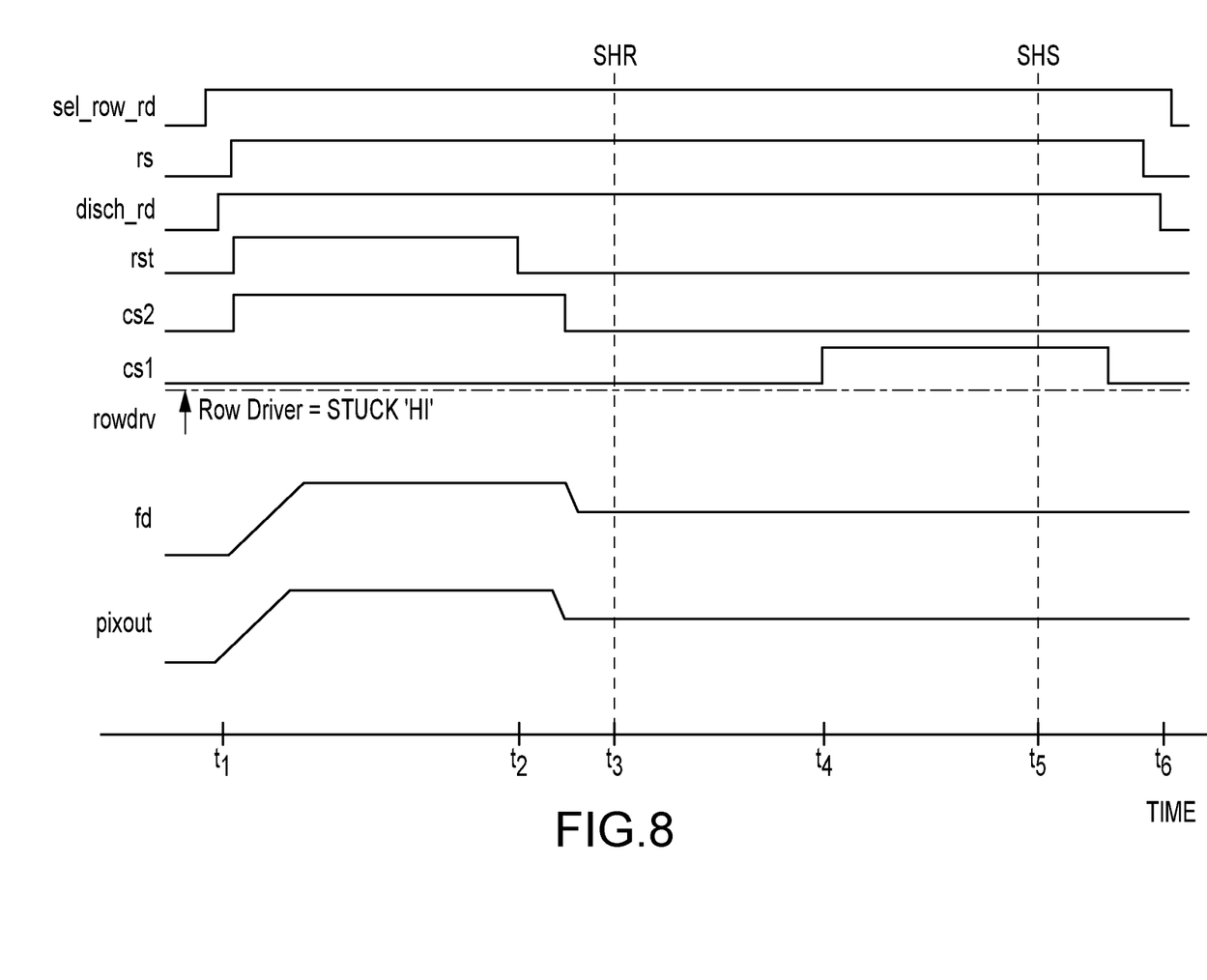
FIG. 8 is a timing diagram showing operation of the verification circuitry of FIG. 5 during a read phase when the tested row driver signal is stuck high in accordance with an embodiment.
Figure 9:
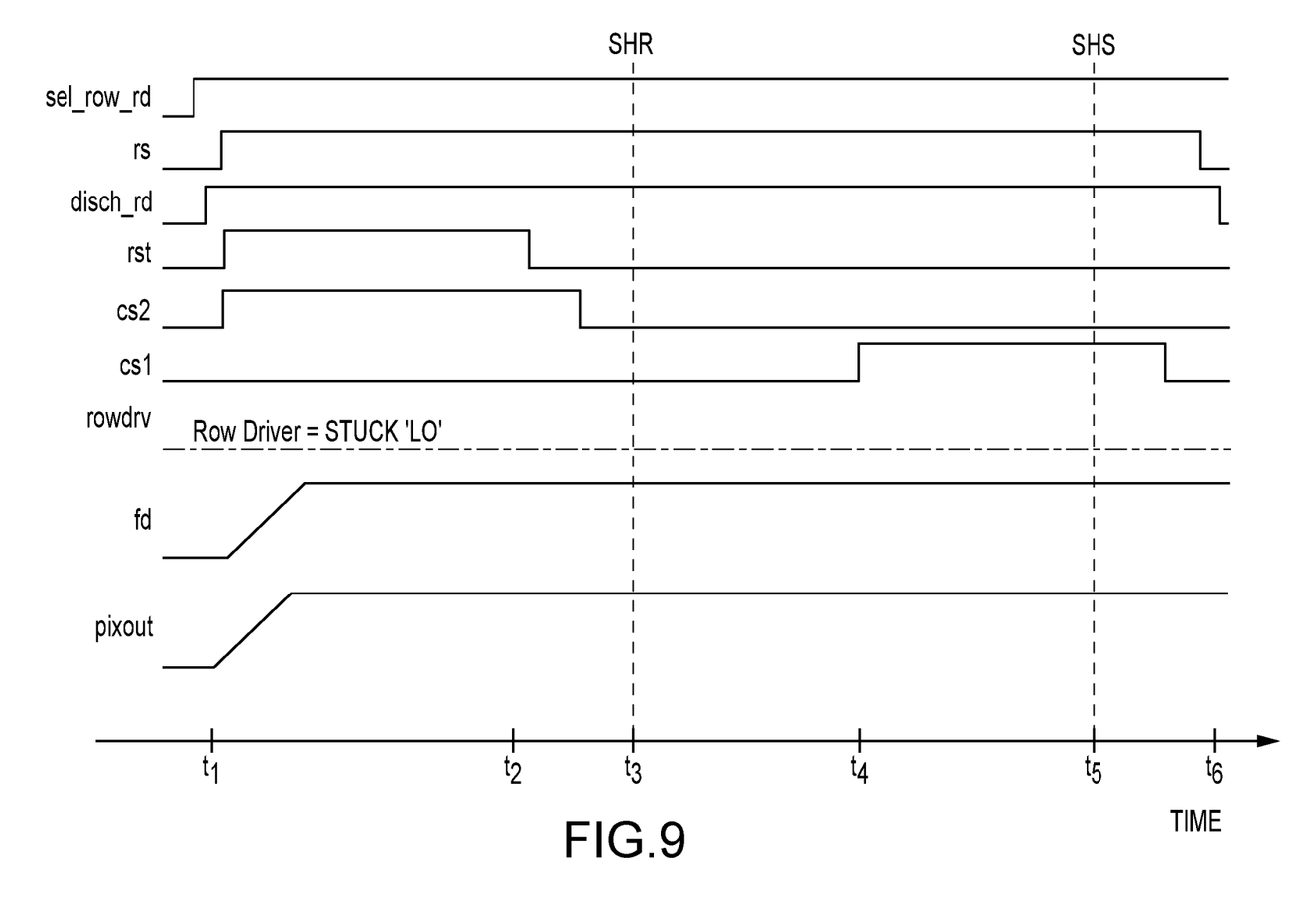
FIG. 9 is a timing diagram showing operation of the verification circuitry of FIG. 5 during a read phase when the tested row driver signal is stuck low in accordance with an embodiment.

After the intentional discharge phase, a read phase may be performed. FIG. 7 shows the read phase when the row driver is operating properly. FIG. 8 shows the read phase when the row driver is stuck high. FIG. 9 shows the read phase when the row driver is stuck low.

As shown in FIG. 7, during the read phase, control signals sel_row_rd, rs, disch_rd, rst, and cs2 may be raised high at $t_1$. Asserting sel_row_rd throughout the read phase causes transistors 110 and 132 to be asserted throughout the read phase. Asserting disch_rd throughout the read phase causes transistors 112 and 134 to be asserted throughout the read phase. Because transistors 110 and 112 are both asserted throughout the read phase, any assertion of rowdrv would cause capacitor 118 to be discharged to $V_{SHHLOGIC}$. Because transistors 132 and 134 are both asserted throughout the read phase, any assertion of rowdrv would cause capacitor 140 to be discharged to $V_{SHHLOGIC}$.

Row select control signal RS is asserted throughout the read phase, causing transistors 122, 144, 148, and 154 to be asserted throughout the read phase. This enables sampling of PIXOUT onto column output line 40.

As shown in FIG. 7, reset control signal RST and capacitor transfer signal CS2 are raised high between $t_1$ and $t_2$. Consequently, the floating diffusion region 150 is reset to $V_{DDPRECH}$. Because the row driver is operating normally, capacitors 118 and 140 start the read phase (e.g., before $t_1$) at $V_{SSHLOGIC}$. However, transistors 120, 122, 148, and 146 are all asserted between $t_1$ and $t_2$. This results in capacitor 118 being reset to $V_{DDPRECH}$. However, CS1 remains low at this time. Therefore, transistor 142 is not asserted and capacitor 140 remains at $V_{SSHLOGIC}$.

After control signals rst and cs2 are dropped low (deasserting transistors 120 and 146), the voltage at floating diffusion 150 may be sampled at $t_3$. This sample may be considered the reset level of the floating diffusion region and may be referred to as sample-and-hold reset (SHR).

At $t_4$, CS1 is raised high. This causes the voltage from capacitor 140 ($V_{SSHLOGIC}$) to be transferred to floating diffusion region 150. Consequently, the FD voltage drops as shown in FIG. 7. At $t_5$, the FD voltage is sampled. This sample may be considered the signal level of the floating diffusion region and may be referred to as sample-and-hold signal (SHS).

At $t_6$, the control signals (e.g., CS1, sel_row_rd, rs, disch_rd) may be returned to low levels.

As shown in FIG. 7, there is a swing in PIXOUT between SHR at $t_3$ and SHS at $t_5$. The difference between PIXOUT between the two samples indicates that the row driver signal being tested is operating properly. As will be shown in FIGS. 8 and 9, PIXOUT may not have any change between $t_3$ and $t_5$ when the row driver is stuck high or stuck low.

FIG. 8 is a timing diagram showing the read phase when the row driver is stuck high. As discussed in connection with FIG. 6, when the row driver is stuck high, capacitors 118 and 140 will still enter the read phase at $V_{SSHLOGIC}$.

During the read phase, control signals sel_row_rd, rs, disch_rd, rst, and cs2 may be raised high at $t_1$. Asserting sel_row_rd throughout the read phase causes transistors 110 and 132 to be asserted throughout the read phase. Asserting disch_rd throughout the read phase causes transistors 112 and 134 to be asserted throughout the read phase. Because transistors 110 and 112 are both asserted throughout the read phase, any assertion of rowdrv would cause capacitor 118 to be discharged to $V_{SHHLOGIC}$. Because transistors 132 and 134 are both asserted throughout the read phase, any assertion of rowdrv would cause capacitor 140 to be discharged to $V_{SHHLOGIC}$.

Row select control signal RS is asserted throughout the read phase, causing transistors 122, 144, 148, and 154 to be asserted throughout the read phase. This enables sampling of PIXOUT onto column output line 40.

As shown in FIG. 8, reset control signal RST and capacitor transfer signal CS2 are raised high between $t_1$ and $t_2$. Consequently, the floating diffusion region 150 is reset to $V_{DDPRECH}$. Between $t_1$ and $t_2$, transistors 120, 122, 148, and 146 are all asserted. This results in capacitor 118 being reset to $V_{DDPRECH}$. CS1 remains low at this time. Therefore, transistor 142 is not asserted and capacitor 140 remains at $V_{SSHLOGIC}$.

After control signals rst and cs2 are dropped low (deasserting transistors 120 and 146), the voltage VS2 at capacitor 118 may drop from $V_{DDPRECH}$ to $V_{SSHLOGIC}$ due to an unintentional discharge of the capacitor. Although the capacitor was reset to $V_{DDPRECH}$ at the start of the read phase, the fact that the row driver signal rowdrv is stuck high means that transistors 108, 110, and 112 are all asserted. Therefore, the capacitor is unintentionally discharged back to $V_{SHHLOGIC}$ despite previously being reset to $V_{DDPRECH}$.

The voltage at floating diffusion 150 may be sampled at $t_3$. During this sample (SHR), the floating diffusion is sampled at $V_{SSHLOGIC}$ due to the unintentional discharge caused by rowdrv being stuck high.

At $t_4$, CS1 is raised high. This causes the voltage from capacitor 140 ($V_{SSHLOGIC}$) to be transferred to floating diffusion region 150. However, FD is already at $V_{SSHLOGIC}$ so there is no change to the FD voltage. At $t_5$, the FD voltage is sampled (SHS).

At $t_6$, the control signals (e.g., CS1, sel_row_rd, rs, disch_rd) may be returned to low levels.

As shown in FIG. 8, there is no swing in PIXOUT between SHR at $t_3$ and SHS at $t_5$. The absence of swing of PIXOUT between the two samples indicates that the row driver signal being tested is not operating properly.

FIG. 9 is a timing diagram showing the read phase when the row driver is stuck low. As discussed in connection with FIG. 6, when the row driver is stuck low, capacitors 118 and 140 will enter the read phase at $V_{DDPRECH}$.

During the read phase, control signals sel_row_rd, rs, disch_rd, rst, and cs2 may be raised high at $t_1$. Asserting sel_row_rd throughout the read phase causes transistors 110 and 132 to be asserted throughout the read phase. Asserting disch_rd throughout the read phase causes transistors 112 and 134 to be asserted throughout the read phase. Because transistors 110 and 112 are both asserted throughout the read phase, any assertion of rowdrv would cause capacitor 118 to be discharged to $V_{SHHLOGIC}$. Because transistors 132 and 134 are both asserted throughout the read phase, any assertion of rowdrv would cause capacitor 140 to be discharged to $V_{SHHLOGIC}$.

Row select control signal RS is asserted throughout the read phase, causing transistors 122, 144, 148, and 154 to be asserted throughout the read phase. This enables sampling of PIXOUT onto column output line 40.

As shown in FIG. 9, reset control signal RST and capacitor transfer signal CS2 are raised high between $t_1$ and $t_2$. Consequently, the floating diffusion region 150 is reset to $V_{DDPRECH}$. Between $t_1$ and $t_2$, transistors 120, 122, 148, and 146 are all asserted. This would result in capacitor 118 being reset to $V_{DDPRECH}$ if capacitor 118 had been properly discharged during the intentional discharge phase. However, since rowdrv is stuck low, capacitor 118 is already at $V_{DDPRECH}$ and the reset does not change the capacitor voltage level. CS1 remains low at this time. Transistor 142 is not asserted and capacitor 140 also remains at $V_{DDPRECH}$.

After control signals rst and cs2 are dropped low (deasserting transistors 120 and 146), the voltage at floating diffusion 150 may be sampled at $t_3$. This sample may be considered the reset level of the floating diffusion region and may be referred to as sample-and-hold reset (SHR).

At $t_4$, CS1 is raised high. This causes the voltage from capacitor 140 ($V_{DDPRECH}$) to be transferred to floating diffusion region 150. However, FD is already at $V_{DDPRECH}$ so there is no change to the FD voltage. At $t_5$, the FD voltage is sampled (SHS).

At $t_6$, the control signals (e.g., CS1, sel_row_rd, rs, disch_rd) may be returned to low levels.

As shown in FIG. 9, there is no swing in PIXOUT between SHR at $t_3$ and SHS at $t_5$. The absence of swing of PIXOUT between the two samples indicates that the row driver signal being tested is not operating properly.

The verification circuitry of FIG. 5 can therefore determine if a row driver control signal is properly switching between a high state and a low state. The transistors used to form the verification circuitry of FIG. 5 may all be n-channel metal-oxide semiconductor (nMOS) transistors. Including only nMOS transistors in the pixel sensor chip (and no pMOS transistors) may reduce the amount of implant steps to form the chip during manufacturing. Additionally, forming the pixel sensor chip with only nMOS transistors (and no pMOS transistors) may reduce contamination. The verification circuitry of FIG. 5 may be operable using only nMOS transistors. Additionally, the verification circuitry of FIG. 5 may test the row driver control signal without any intermediate modification of the row driver control signal (e.g., no level shifter is required to shift the row driver control signal before testing). The verification circuitry receives the row driver control signal in the exact form that the pixels do. This reduces opportunity for failure within the verification circuitry. The verification circuitry of FIG. 5 may also occupy minimal space on the pixel sensor chip compared to arrangements where a level shifter, latch circuit, or additional circuitry is used.

It should be understood that, in FIG. 5, two identical circuits are coupled to the floating diffusion region. For example, transistors 104, 106, 108, 110, 112, 114, 116, 120, and 122 as well as capacitor 118 form a first branch of the circuit. Transistors 126, 128, 130, 132, 134, 136, 138, 142, and 144 as well as capacitor 140 form a second branch of the circuit. The first and second branches have the same structure. In some cases, one of the two branches may be omitted and the verification circuitry may include only a single branch. For example, if a three transistor readout (a 3T read) is used, only one branch may be required. If a four transistor readout (a 4T read) is used, two branches may be used as in FIG. 5 to allow detection of a stuck high row driver signal.

The foregoing is merely illustrative of the principles of this invention and various modifications can be made by those skilled in the art. The foregoing embodiments may be implemented individually or in any combination.

What is claimed is:

1. An image sensor comprising:
   an array of imaging pixels;
   a row driver that provides a control signal to the array of imaging pixels; and
   verification circuitry configured to test operation of the row driver, wherein verification circuitry comprises:
   a storage capacitor;
   a first bias voltage supply terminal;
   a first transistor that is interposed between the storage capacitor and the first bias voltage supply terminal;
   a second bias voltage supply terminal; and
   second and third transistors that are coupled in series between the storage capacitor and the second bias voltage supply terminal.

2. The image sensor defined in claim 1, wherein the second transistor has a gate that receives the control signal from the row driver.

3. The image sensor defined in claim 1, wherein the verification circuitry further comprises:
   a floating diffusion region; and
   a fourth transistor that is interposed between the storage capacitor and the floating diffusion region.

4. The image sensor defined in claim 3, wherein the verification circuitry further comprises:
   a source follower transistor having a gate that is coupled to the floating diffusion region;
   a row select transistor that is coupled between the source follower transistor and an output line.

5. The image sensor defined in claim 4, wherein the verification circuitry further comprises:
   a fifth transistor that is coupled between the storage capacitor and the second bias voltage supply terminal in series with the second transistor and in parallel with the third transistor.

6. The image sensor defined in claim 5, wherein the first, second, third, fourth and fifth transistors and the storage capacitor form at least part of a first verification circuit branch and wherein the verification circuitry comprises a second verification circuit branch with the same arrangement as the first verification circuit branch.

7. The image sensor defined in claim 5, wherein the storage capacitor is a first storage capacitor and wherein the verification circuitry further comprises:
   a second storage capacitor;
   a sixth transistor that is interposed between the second storage capacitor and the first bias voltage supply terminal;
   seventh and eighth transistors that are coupled in series between the second storage capacitor and the second bias voltage supply terminal;

a ninth transistor that is interposed between the second storage capacitor and the floating diffusion region; and a tenth transistor that is coupled between the second storage capacitor and the second bias voltage supply terminal in series with the seventh transistor and in parallel with the eighth transistor.

8. The image sensor defined in claim 7, wherein the second transistor has a gate that receives the control signal from the row driver and wherein the seventh transistor has a gate that receives the control signal from the row driver.

9. The image sensor defined in claim 8, wherein the verification circuitry further comprises:

an eleventh transistor, wherein the first and eleventh transistors are coupled in series between the first storage capacitor and the first bias voltage supply terminal; and a twelfth transistor, wherein the sixth and twelfth transistors are coupled in series between the second storage capacitor and the first bias voltage supply terminal.

10. The image sensor defined in claim 5, wherein the verification circuitry further comprises:

a reset transistor that is coupled between the floating diffusion region and the first bias voltage supply terminal.

11. An image sensor comprising:

an array of imaging pixels having a first row;

a row driver configured to provide a control signal to the first row; and a verification circuitry block configured to receive the control signal and test operation of the row driver, wherein the verification circuitry block comprises a charge storage region, a pre-charge transistor coupled between the charge storage region and a first bias voltage supply terminal, and a verification transistor that is coupled between the charge storage region and a second bias voltage supply terminal and that has a gate that receives the control signal.

12. The image sensor defined in claim 11, wherein the charge storage region, the pre-charge transistor, and the verification transistor form at least part of a first branch of the verification circuitry block and wherein the verification circuitry block includes a second branch that is the same as the first branch.

13. The image sensor defined in claim 11, wherein the verification circuitry block further comprises:

a first transistor that is coupled to the pre-charge transistor, wherein the pre-charge transistor and the first transistor are coupled in series between the first bias voltage supply terminal and the charge storage region.

14. The image sensor defined in claim 13, wherein the verification circuitry block further comprises:

second and third transistors that are coupled in series with the verification transistor between the charge storage region and the second bias voltage supply terminal.

15. The image sensor defined in claim 14, wherein the verification circuitry block further comprises:

fourth and fifth transistors that are coupled in series with the verification transistor between the charge storage region and the second bias voltage supply terminal, wherein the fourth and fifth transistors are coupled in parallel with the second and third transistors between the verification transistor and the second bias voltage supply terminal.

16. The image sensor defined in claim 15, wherein the verification circuitry block further comprises:

a floating diffusion region; and sixth and seventh transistors that are coupled in series between the charge storage region and the floating diffusion region.

17. The image sensor defined in claim 16, wherein the verification circuitry block further comprises:

eighth and ninth transistors that are coupled in series between the floating diffusion region and the first bias voltage supply terminal;

a source follower transistor having a gate that is coupled to the floating diffusion region; and a row select transistor that is coupled between the source follower transistor and a column output line.

18. An image sensor comprising:

an array of imaging pixels;

a row driver that provides a control signal to the array of imaging pixels; and verification circuitry that includes first and second storage capacitors and first and second transistors having respective first and second gates that receive the control signal, wherein the verification circuitry is configured to:

pre-charge the first and second storage capacitors to a first bias voltage;

intentionally discharge the first and second storage capacitors to a second bias voltage using the first and second transistors;

reset only the first storage capacitor back to the first bias voltage; and use a first sample from the first storage capacitor and a second sample from the second storage capacitor to test operation of the row driver.

19. The image sensor defined in claim 18, wherein pre-charging the first and second storage capacitors to the first bias voltage comprises asserting first and second pre-charge transistors that are interposed between the first and second storage capacitors and a first bias voltage supply terminal.

20. The image sensor defined in claim 19, wherein the first and second transistors are coupled between the first and second storage capacitors and a second bias voltage supply terminal and wherein intentionally discharging the first and second storage capacitors to the second bias voltage comprises asserting the first and second transistors.

* * * * *